3,023,043
PIE AND CASSEROLE LIFTER
Glenn Calvin Ragains, Rte. 4, Boise, Idaho
Filed Sept. 21, 1959, Ser. No. 841,410
2 Claims. (Cl. 294—31)

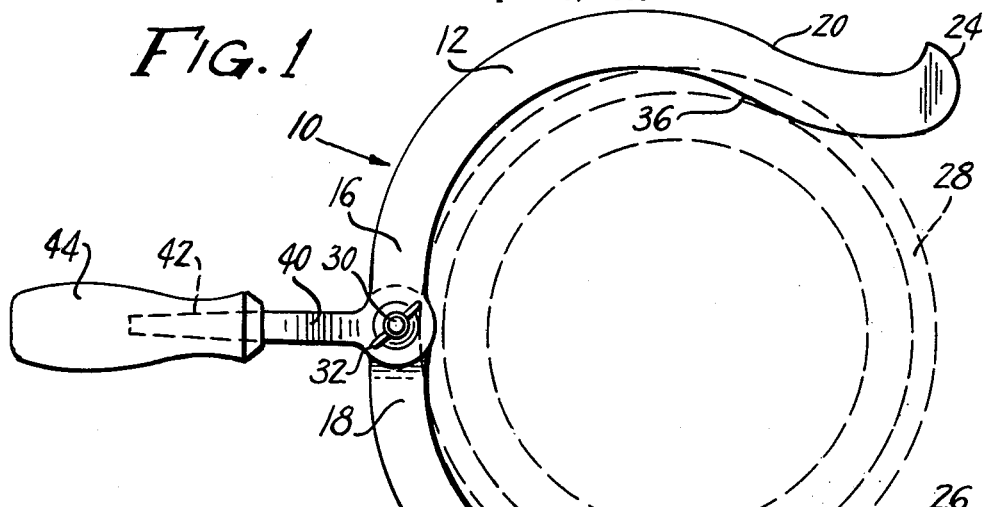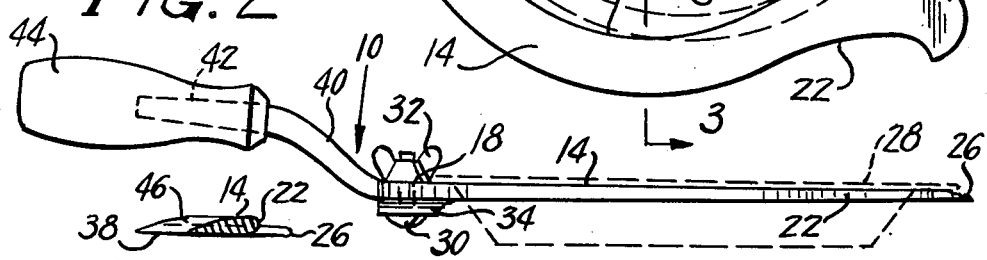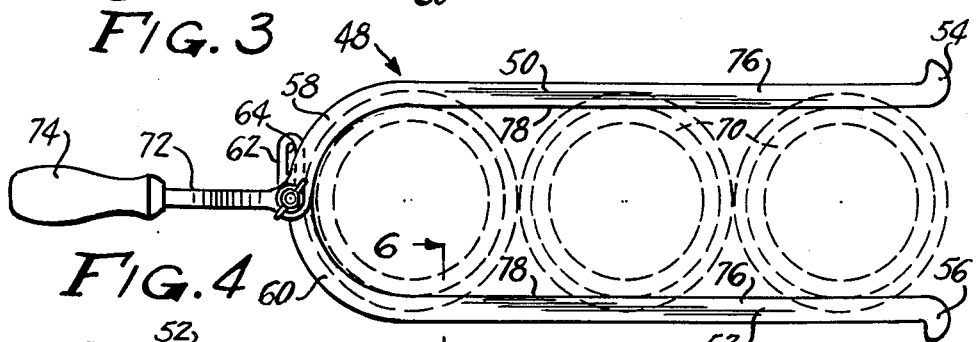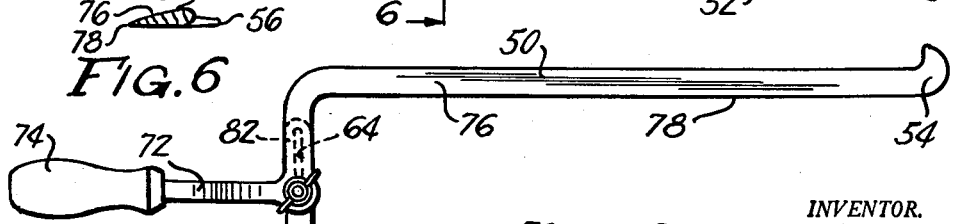
INVENTOR.
GLENN C. RAGAINS
BY Gustave Miller
ATTORNEY

United States Patent Office 3,023,043
Patented Feb. 27, 1962

This invention relates to a pie and casserole lifter, and particularly to a device for manually lifting and safely transporting dishes, such as pie pans and casseroles from a table surface to a hot oven, and from a hot oven surface to a table surface, without danger of burning the person handling the same, or without endangering the person in any way.

A further object of this invention is to provide a dish lifter or holder which will readily cooperate with the upwardly beveled rim of a dish such as a pipe plate or casserole in lifting and holding the dish for inserting the dish into a hot oven and for removing it therefrom without danger of burning the person handling the same.

A further object of this invention is to provide a device which has two oppositely disposed dish holding and lifting arms in a fixed size relation to each other, and which has an adjustable securing means for making it possible to change the fixed size of the arms to any other fixed size relation, within the limits of the particular article.

Still a further object of this invention is to provide a dish lifting means having a pair of oppositely disposed arms that are beveled downwardly toward their inner edges to cooperate with the rim of a dish, and that are also tapered toward free ends that are outwardly curved so as to facilitate positioning the lifter under a dish to lift and hold the dish, and wherein the arms may be long enough to hold and lift several dishes, of the same size, simultaneously.

With the above and related objects in view, this invention consists in the details of construction and combination of parts, as will be more fully understood from the following description, when read in conjunction with the accompanying drawing, in which:

FIG. 1 is a top plan view of a form of the lifter of this invention for lifting and holding a single dish at a time.

FIG. 2 is a side elevation of FIG. 1.

FIG. 3 is a sectional view on line 3—3 of FIG. 1.

FIG. 4 is a top plan view of another form, for lifting and holding several dishes simultaneously.

FIG. 5 is a top plan view of a slightly modified form over FIG. 6.

FIG. 6 is a sectional view on line 6—6 of both FIGS. 4 and 5.

There is shown at 10 one form of the lifter and holder of this invention, particularly intended for lifting and holding a single dish, such as a pie pan or casserole. In this form of the invention, at 10, there is shown at 12 and 14 two oppositely disposed flat arms which are curved substantially as shown, from inturned ends 16 and 18 to somewhat slightly outwardly curved portions 20 and 22 terminating in outwardly turned free ends 24 and 26. As shown in side elevation in FIG. 2, the arms 12 and 14 are tapered from their thicker inturned ends 16 and 18 to their outwardly curved portions 20 and 22, and then, at their outwardly turned free ends 24 and 26, are tapered even more sharply toward the common plane of their bottom surfaces. In addition, as shown in cross-section in FIG. 3, the arms 12 and 14 are tapered or beveled from their outer top edges toward their inner edges to a knife edge, at 36 and 38, in the common plane of their bottom surfaces, the arms thus being wedge-shaped in cross-section, thus facilitating a better fit and a better grip on the dish or casserole shown in dash outline at 28.

Although the arms 12 and 14 could obviously be integrally connected, they are preferably adjustably yet fixedly and rigidly connected together by a stud bolt 30 and wing nut 32 extending through the overlapped inturned ends 16 and 18, one of the inturned ends, 18, being offset at 34 in a plane below the plane of the other inturned end 16, so that the ends are overlapped as shown, with the inner knife edges 36 and 38 and the bottom surfaces of the arms in a common plane, the knife edges 36 and 38 being in the common plane so as to facilitate a proper grip on the dish 28 being held.

The other inturned end 16 has a handle shank 40 integrally extending therefrom at a right angle thereto, but curved upwardly from the common plane of the arms 12 and 14 to a handle receiving portion 42 on which is suitably secured a heat insulating handle 44 of any suitable material, such as wood or plastic, the material of the arms 12 and 14 being preferably stainless steel, for strength and rigidity.

In operation, this form of the lifter and holder is intended to lift and hold only a single dish at a time. The arms 12 and 14 are adjusted to each other to a size to best fit the particular dish 28 to be lifted and held thereon, and then the wing nut 32 is tightened on the stud bolt 30 to hold the arms at a fixed size relation to each other, and are left at that fixed size relation for as long as it is to be used for such particular size. The shape of the arms, particularly at 20 and 22, enables the lifter and holder to be set for different size dishes about the pivot connection at bolt 30 and nut 32 yet when set at the particular size, to readily operate with the particular size of dish. The tapered outwardly turned ends 24 and 26 will readily slip under the opposite sides of a dish, due to the knife edges provided thereon, even though their distance apart is not as great as to the diameter of the bottom of the dish, and the dish may then be lifted with its rim, which generally bevels or tapers upwardly, cooperating with the downwardly beveled upper surface 46 of the arms 12 and 14, while the knife edges 36 and 38 securely grip the opposite sides of the dish. Thus, the dish may be readily lifted from a table surface and placed in a hot oven, and thereafter, readily lifted from a hot oven floor or surface, and removed therefrom for placing it on a table surface. It is intended for use in a home kitchen, restaurant, bakery or other commercial food preparing establishment.

In a commercial establishment, however, it may be desirable to lift and hold several dishes simultaneously, and for this purpose, the form of lifters shown in FIGS. 4 and 5 may be provided, both of which involve the essence of this invention.

In FIG. 4, the holder and lifter 48 has elongated arms 50 and 52, extending substantially straight between their outwardly turned free ends 54 and 56 and their inturned curved ends 58 and 60, the end 60 being off-set at 62 and slotted at 64 to cooperate with a stud bolt 66 and wing nut 68 for fixedly adjusting the size relation of the two arms according to the diameter size of the dish 70 to be held thereon, the arms 50 and 52 being long enough, between their ends, to lift and hold several dishes 70 at one time. The arm 50 has an integrally extending handle shank 72 thereon, on the end of which is secured a heat insulating handle 74. The top surfaces 76 of the arms 50 and 52 are tapered or beveled downwardly to a knife edge 78, the same as in the form shown in FIGS. 1, 2 and 3, and the arms 50 and 52 are similarly tapered from their inturned ends 58 and 60 to their outwardly turned free ends 54 and 56, with their outer tip edges knife edged in the same way so as to facilitate slipping under a dish bottom as the lifter is being extended under the dish, in case it should not be exactly aligned with the maximum diameter of the dish, thereby facilitating the placing of the lifter under the dish, the lifter then being moved transversely as necessary to properly position the dish or dishes 70 thereon, as shown in FIG. 4, supporting the dish on their rims and confining the dish between the beveled knife edges.

In FIG. 5, the lifter 80 differs from that of the lifter 48 of FIG. 4 only in the inturned arms 82 and 84 being at right angles to their straight portions 50 and 52, and being otherwise the same, the same reference numerals as in FIG. 4 having been applied thereto, and the same description applying thereto.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A dish lifter comprising a pair of oppositely disposed flat arms fixedly secured together at one inturned end of each arm, the opposite end of each arm being turned in a curve outwardly of each other, the bottom surfaces of said arms extending in a common plane between said inturned and outwardly turned ends, a handle shank integrally extending upwardly at an off-set angle to said common plane from one inturned end of one arm, the upper surfaces of said arms being beveled downwardly from their outside upper edges to a knife edge at their inside lower edges to facilitate supporting the rim of a dish thereon, said arms being longitudinally tapered progressively and gradually from their inturned ends to their outwardly turned ends, the outwardly turned ends being even more sharply tapered to knife edges at their tip ends, and a heat insulating handle fixed on the end of said handle shank above said common plane.

2. The dish lifter of claim 1, and adjustable means for securing said inturned ends together in a fixed desired angle and size relation to each other.

References Cited in the file of this patent

UNITED STATES PATENTS

| | | |
|---|---|---|
| 125,878 | Brewer | Apr. 23, 1872 |
| 844,966 | Smith | Feb. 19, 1907 |
| 850,983 | Valiquette | Apr. 23, 1907 |
| 1,375,268 | Wittenmeyer | Apr. 19, 1921 |
| 1,505,258 | Hagen | Aug. 19, 1924 |
| 2,497,005 | McConnell | Feb. 7, 1950 |
| 2,613,979 | Stillabower | Oct. 14, 1952 |

FOREIGN PATENTS

| | | |
|---|---|---|
| 839,175 | France | Dec. 26, 1938 |
| 217,863 | Germany | Feb. 14, 1909 |
| 52,863 | Sweden | Mar. 9, 1920 |